(12) United States Patent
Cheng et al.

(10) Patent No.: US 11,100,004 B2
(45) Date of Patent: Aug. 24, 2021

(54) SHARED VIRTUAL ADDRESS SPACE FOR HETEROGENEOUS PROCESSORS

(71) Applicants: ATI Technologies ULC, Markham (CA); Advanced Micro Devices, Inc., Sunnyvale, CA (US)

(72) Inventors: Gongxian Jeffrey Cheng, Toronto (CA); Mark Fowler, Boxborough, MA (US); Philip J. Rogers, Austin, TX (US); Benjamin T. Sander, Austin, TX (US); Anthony Asaro, Toronto (CA); Mike Mantor, Orlando, FL (US); Raja Koduri, Sunnyvale, CA (US)

(73) Assignees: ADVANCED MICRO DEVICES, INC., Sunnyvale, CA (US); ATI TECHNOLOGIES ULC, Markham (CA)

( * ) Notice: Subject to any disclaimer, the term of this patent is extended or adjusted under 35 U.S.C. 154(b) by 820 days.

(21) Appl. No.: 14/747,944

(22) Filed: Jun. 23, 2015

(65) Prior Publication Data

US 2016/0378674 A1 Dec. 29, 2016

(51) Int. Cl.
*G06F 12/1009* (2016.01)

(52) U.S. Cl.
CPC .. *G06F 12/1009* (2013.01); *G06F 2212/1016* (2013.01); *G06F 2212/152* (2013.01); *G06F 2212/251* (2013.01)

(58) Field of Classification Search
CPC .................................................. G06F 12/1009
USPC ....................................................... 711/206
See application file for complete search history.

(56) References Cited

U.S. PATENT DOCUMENTS

| | | | |
|---|---|---|---|
| 8,972,694 B1* | 3/2015 | Dolan | G06F 13/28 711/170 |
| 2002/0093507 A1* | 7/2002 | Olarig | G06F 12/1081 345/568 |
| 2005/0022051 A1* | 1/2005 | Zane | G06F 11/2058 714/6.12 |

* cited by examiner

*Primary Examiner* — Jae U Yu

(57) ABSTRACT

A processor uses the same virtual address space for heterogeneous processing units of the processor. The processor employs different sets of page tables for different types of processing units, such as a CPU and a GPU, wherein a memory management unit uses each set of page tables to translate virtual addresses of the virtual address space to corresponding physical addresses of memory modules associated with the processor. As data is migrated between memory modules, the physical addresses in the page tables can be updated to reflect the physical location of the data for each processing unit.

20 Claims, 7 Drawing Sheets

SHARED VIRTUAL ADDRESS SPACE FOR HETEROGENEOUS PROCESSORS

BACKGROUND

Field of the Disclosure

The present disclosure relates generally to processors and more particularly to memory management for processors.

Description of the Related Art

To improve processing speed some processors, referred to as heterogeneous processors, employ heterogeneous processing units, wherein one or more processing units are dedicated to special processing functions. For example, a processor may employ one or more central processing unit (CPU) cores to execute general-purpose instructions and one or more graphics processing units (GPU) cores to execute functions related to graphics and display operations. The GPU cores include circuitry specifically designed to execute these operations, improving overall processor performance. However, because many heterogeneous processor designs are based on non-heterogeneous processor frameworks (e.g., designs including only CPU cores), the improvement in processor performance is limited.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
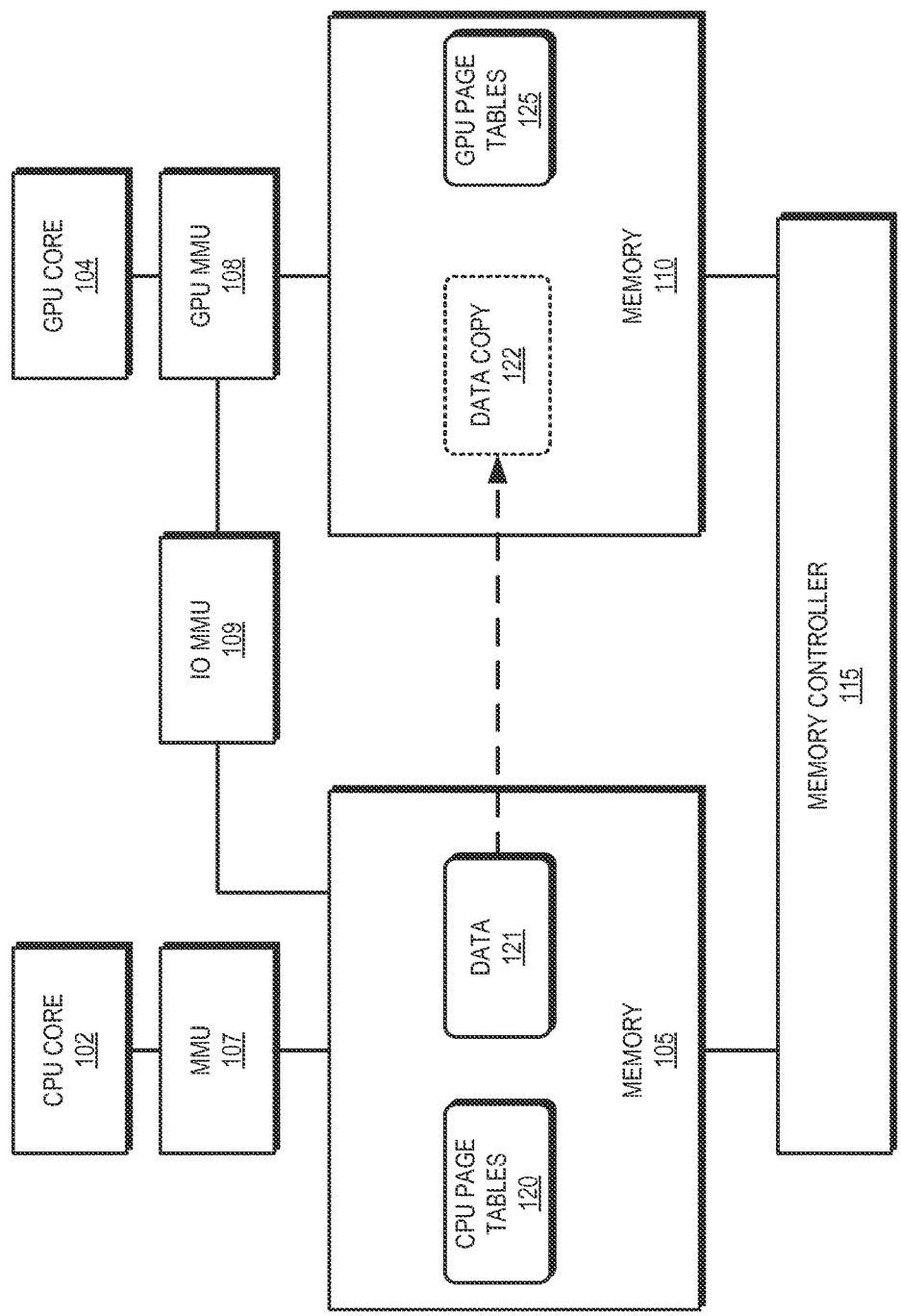
FIG. 1 is a block diagram of a processor that employs the same virtual address space for heterogeneous processing units in accordance with some embodiments.

FIGS. 1-8 illustrate techniques for employing the same virtual address space for heterogeneous processing units of a processor. The processor employs different sets of page tables for different types of processing units, such as a CPU and a GPU, wherein a memory management unit uses each set of page tables to translate virtual addresses of the virtual address space to corresponding physical addresses of memory modules associated with the processor. As data is migrated between memory modules, the physical addresses in the page tables can be updated to reflect the physical location of the data for each processing unit. This allows the processor to efficiently locate data in memory without employing disparate virtual address spaces for different processing unit types, thereby improving performance.

To illustrate via an example, a processor can employ a CPU (sometimes referred to as a CPU core) and a GPU (sometimes referred to as a GPU core), as well as memory modules of different types. The memory modules are arranged so that the CPU and the GPU can each access different memory modules more quickly or efficiently. Accordingly, it can be beneficial for the processor to move data to different memory modules to ensure that the different processing units are efficiently accessing the data. However, in a conventional processor each of the different types of processing units employs different virtual address spaces. Accordingly data is either pinned to a particular memory module in such a processor or, if the data is migrated, the processor must allocate a buffer for the data in the virtual address space for each processing unit type. This overhead, as well as the overhead to maintain coherency between the buffers, limits the efficiency of migrating the data between memory modules. By employing the same virtual address space for different processing unit types, data can be efficiently migrated between memory modules, thus improving processor performance.

In some embodiments, and as described further below, in order to maintain the same virtual address space the processor can implement different address translation schemes for different blocks of data, depending on where that data is stored. To illustrate via an example, four different pages of data can be stored at memory modules associated with the processor: 1) a first page stored in system memory associated with a CPU, but not pinned to a particular set of locations of the system memory; 2) a second page stored at system memory and pinned to a given set of locations of the system memory; 3) a third page transferred from the system memory to a memory associated with a GPU (referred to as the "GPU local memory"), wherein the CPU is not to access the page; and 4) a fourth page copied from the system memory to the GPU local memory, wherein the page may be concurrently accessed at the system memory (by the CPU) and at the GPU local memory (by the GPU). The processor employs a different address translation scheme for memory accesses from the GPU to each of the four pages, to wit: 1) for accesses by the GPU to the first page, the virtual address of the memory access request is translated using a set of CPU page tables; 2) for accesses by the GPU to the second page, the virtual address is translated using a set of GPU page tables, wherein the GPU page table entry (PTE) for the virtual address matches the CPU PTE for the virtual address; 3) for accesses by the GPU to the third page, the virtual address is translated using the GPU page tables, and the CPU page tables may not maintain an entry for the virtual address; and 4) for GPU accesses to the fourth page, the virtual address is translated using the GPU page tables, but the CPU page tables maintain a separate entry for the virtual address, having a different physical address than the corresponding GPU PTE. By using different address translation schemes depending on where a block of data is stored and depending on which processing unit is accessing the data, the processor can maintain a common virtual address space between the processing units while also moving data between memory modules so that data can be accessed efficiently.

FIG. 1 illustrates a heterogeneous processor 100 in accordance with some embodiments. The processor 100 can be incorporated into any of a variety of electronic devices, including a desktop computer, laptop computer, server, gaming console, smartphone, tablet, and the like. The processor 100 is generally configured to execute instructions, organized in the form of one or more computer programs, to perform tasks on behalf of an electronic device. To facilitate execution of instructions, the processor 100 includes a CPU core 102 and a GPU core 104. The CPU core 102 includes one or more instruction pipelines and associated circuitry to execute general-purpose instructions. The GPU core 104 includes circuitry to execute operations related to graphics and display functions. In some embodiments, these operations are assigned to the GPU core 104 by a program executing at the CPU core 102. It will be appreciated that in some embodiments the processor 100 can include additional CPU cores and GPU cores. Further, in some embodiments the processor 100 can include other types of processing units in addition to or instead of CPUs and GPUs, such as digital signal processor (DSP) units, field programmable gate arrays (FPGAs), and the like.

In the illustrated example, the processor 100 includes memory modules 105 and 110. These memory modules are in addition to any caches or scratchpads (not shown) dedicated to one of the CPU core 102 and GPU core 104. In some embodiments, the memory modules are of different architectures. Accordingly, each of the memory modules can be more efficiently accessed by one of the CPU core 102 and GPU core 104. For purposes of description, it is assumed that the GPU core 104 can access the memory module 110 more efficiently than the memory module 105. In addition, it is assumed that the memory module 105 stores all data that is to be accessed by either the CPU core 102 or the GPU core 104, and the memory module 105 is therefore sometimes referred to herein as "system memory". In contrast, the memory module 110 stores a subset of the data stored at the system memory, wherein the subset is at least some of the data to be accessed by the GPU core 104. Accordingly, the memory module 110 is sometimes referred to as "GPU local memory".

The memory modules 105 and 110 each include a plurality of memory locations, with each memory location corresponding to a different physical address. The programs and operations executed at the CPU core 102 and GPU core 104 manipulate units of data, with each data unit corresponding to a virtual address. The range of virtual addresses employed by the CPU core 102 and GPU core 104 is referred to as the processing unit's virtual address space. As described further herein, the processor 100 performs address translation and other operations so that the CPU core 102 and GPU core 104 share at least a portion of their respective virtual address spaces. The shared portion of the virtual address spaces is such that the same virtual address in each virtual address space refers to the same unit of data.

To access data at the memory modules 105 and 110, the CPU core 102 and GPU core 104 can each generate operations, referred to as memory access requests. The memory access requests can include, for example, read requests to read data from a location and write requests to write data to a location. Each memory access request includes a virtual address indicating the location of the data to be accessed which is to be translated to a corresponding physical address for execution at one of the memory modules 105 and 110. To facilitate address translation, the processor 100 includes a set of memory management units (MMUs), including an MMU 107, an input/output MMU (IOMMU) 109, and a GPU MMU 108. As described further herein, depending on the processing unit or other module that issues a memory access request and the location of the data targeted by the request, a selected one of the MMUs 107-109 translates the virtual address of the memory access request to a corresponding physical address indicating the location of one of the memory modules 105 and 110 where the data is stored. The memory access request with the physical address is provided to a memory controller 115 for execution at the corresponding memory module.

To facilitate translation of virtual addresses to physical addresses, an operating system or other program at the processor 100 generates a set of page tables for each of the CPU core 102 and GPU core 104. In the embodiment of FIG. 1, the set of page tables for the CPU core 102 is illustrated as CPU page tables 120 and the set of page tables for the GPU core 104 is illustrated as GPU page tables 125. Each of the set of page tables represents a mapping of the virtual address space for the corresponding processing unit to a corresponding set of physical addresses indicating the memory locations where the corresponding data is stored at the memory modules 105 and 110. In particular, each of the page tables 120 and 125 includes a plurality of entries, with each entry including a virtual address and the corresponding physical address where the data associated with the virtual address is stored. In response to the CPU 102 or GPU 104 issuing a memory access, one of the MMUs 107-109 translates the virtual address of the request to the corresponding physical address using the page tables, for example, of the processing unit that issued the request. In particular, the MMU performs a page table walk to identify an entry of the page table corresponding to the virtual address of the request. The identified page table entry indicates the physical address corresponding to the virtual address.

As explained above, the CPU 102 and GPU 104 share a common virtual address space. Accordingly, at least some of the entries of the CPU page tables 120 and GPU page tables 125 can have the same virtual addresses. However, as described further herein, the entries of the page tables 120 and GPU page tables 125 can be individually modified to change the physical address corresponding to a given virtual address. For example, one entry of the GPU page tables 125, associated with a given virtual address, can indicate a physical address for the virtual address at the memory module 110. Another entry of the GPU page tables 125, for a different virtual address, can indicate that the IOMMU 109 is to translate the virtual address to a physical address using the CPU page tables 120. Thus, the MMUs 107-109 translate the same virtual address space to different sets of physical addresses, depending on whether a memory access request was issued by the CPU 102 or the GPU 104 and depending on the location of the data being accessed. This allows data to be migrated from one memory module to another in order to improve processing efficiency, without altering the virtual address space of the CPU 102 and GPU 104.

To illustrate, in some embodiments the memory controller 115 can analyze patterns in the memory access requests generated at the CPU 102 and GPU 104 and, based on these patterns, an OS or another migration program or module migrates data to one of the memory modules 105 and 110 to enhance processing efficiency. The entity that controls the migration of data can be an OS, another program executing at the CPU 102, a set of instructions executing at the GPU 104, a direct memory access (DMA) engine, and the like. For purposes of description it is assumed that the data migration is managed by an OS in conjunction with the memory controller 115. For example, based on the patterns in the memory access requests the memory controller 115 can identify that a block of data, illustrated as data 121 is likely to be frequently accessed in the near future by the GPU 104. In response, the memory controller 115 migrates the data to the memory module 110, where it can be more efficiently accessed by the GPU 104, thus improving overall processing efficiency. For purposes of description, it is assumed that the CPU 102 accesses the data it needs from system memory (the memory module 105), and that data is only migrated to improve access efficiency by the GPU 104. It will be appreciated that other data migration schemes can be implemented, including data migration schemes wherein data is migrated to improve access efficiency by the CPU 102, without departing from the scope of the present disclosure.

In order to allow the GPU 104 to share the same virtual address space with the CPU 102 while maintaining data coherency, the processor 100 implements a memory management scheme wherein the GPU 104 accesses blocks of data in four different ways, depending on the location of the block of data. For purposes of description, the blocks of data are assumed to be at the granularity of a page of data as employed by an OS executing at the CPU 102. First, some data pages (referred to as "unmigrated, unpinned pages") are stored at the memory module 105 and not migrated to the memory module 110, and further are not pinned to a particular set of memory locations at the memory module 105. That is unmigrated, unpinned pages can be moved to different locations at the memory module 105 based on, for example, the needs of the CPU 102. For memory accesses to unmigrated, unpinned pages, the GPU 104 employs the IOMMU 109 to translate virtual the physical addresses. The IOMMU 109 performs the address translation using the CPU page tables 120, which maintain the most up-to-date physical location for each unmigrated, unpinned page.

Second, some data pages (referred to as "unmigrated, pinned pages") are stored at the memory module 105 and not migrated to the memory module 110, and further are pinned to a particular set of memory locations at the memory module 105. For memory access requests targeted to unmigrated, pinned pages the GPU 104 employs the GPU MMU 108 to translate virtual addresses to physical addresses in memory module 105. The GPU MMU 108 performs the address translation using the GPU page tables 125. The use of the GPU page tables 125 is enabled by the pinned nature of the pages. In particular, because unpinned pages can be moved to different locations of the memory module 105, the PTEs for unpinned pages must be updated relatively frequently. Because only the CPU page tables 120 are used (by both the CPU 102 and the GPU 104 via the IOMMU 109) to perform address translation for unpinned pages, only the CPU page tables 120 need to be updated as the pages are moved around, improving processing efficiency. In contrast, pinned pages are not moved to different locations of the memory module 105. Accordingly, the virtual-to-physical address mappings for these pages can be maintained at both the CPU page tables 120 and GPU page tables 125 relatively efficiently. This allows the GPU 104 to use the GPU page tables 125 to access pinned pages, enhancing the efficiency of memory accesses at the processor 100.

Third, some pages are migrated from the memory module 105 to the memory module 110, but the CPU 102 needs to retain the ability to access the memory page. For purposes of description, such pages are referred to as "migrated, CPU-access" pages. An example of a migrated, CPU-access page is illustrated at FIG. 1 as data 121. The memory controller 115 migrates the page by copying the data 121 from the memory module 105 to a data block, illustrated as data 122, at the memory module 110. The memory controller 115 then updates the entries of the GPU page tables 125 corresponding to the data 122 so that the entries reflect the physical addresses of the data at the memory module 110. The memory controller 115 leaves the physical addresses of the CPU page tables 120 unchanged. Accordingly, when the GPU 104 accesses the data using the corresponding virtual addresses, the data is accessed at the data 122 at the memory module 110. When the CPU 102 accesses the data using the same virtual addresses, the data is accessed at the data 121 at the memory module 105. Thus, the memory controller 115 is able to migrate data so that it can be more efficiently accessed by the GPU 104, while allowing the GPU 104 and CPU 102 to employ the same virtual address space, simplifying coordination between the processing units.

In some embodiments, the memory controller 115 monitors portions of the data 122 that are modified by write accesses from the GPU 104. In response to the CPU 102 attempting to access a corresponding portion of the data 121, the memory controller 115 executes a reverse migration by copying the data 122 to the data 121. The memory controller 115 thus maintains coherency between the data 121 and the data 122. In some embodiments, migrations can occur in either direction. For example, modifications to the data 121 by the CPU 102 can be migrated to the data 122, either by re-migrating the entire data 121 after modification, or migrating only the modified portions of the data.

By leaving the CPU page tables 120 unmodified in response to data migrations, the processor 100 ensures that memory management schemes employed by an operating system or other program are maintained. In some embodiments, the memory controller 115 migrates the data 121 by moving it to the memory module 110 and updating both the CPU page tables 120 and GPU page tables 125 to reflect the physical addresses of the moved data. The CPU 102 and GPU 104 then both access the data 121 at the memory module 110.

Fourth, some pages are migrated from the memory module 105 to the memory module 110, but the CPU 102 does not need to retain the ability to access the memory page because, for example, programs executing at the CPU 102 will not access the data, or the program does not execute on the CPU 102 but on the GPU 104 only. For purposes of description, such pages are referred to as "migrated, no-CPU-access" pages. For migrated, no-CPU-access pages, the page can be copied from the memory module 105 to the memory module 110, and the GPU page tables 125 updated to indicate the physical addresses of the data at the memory module 110. For accesses to migrated, no-CPU-access pages, the GPU MMU 108 performs address translation using the GPU page tables 125. However, the entries of the CPU page tables 120 for migrated, no-CPU pages are not updated or maintained, reducing memory management overhead.

In some embodiments, the access type for each page (i.e., whether a page is a unmigrated, unpinned page, an unmigrated, pinned page, a migrated, CPU-access page, or a migrated, no-CPU-access page is indicated by a portion of the PTE for the page at the GPU page tables 125. For each memory access request issued by the GPU 104, the GPU MMU 108 identifies the type of page as indicated by the PTE for the page. Based on the indicated type of page, the GPU MMU 108 or the IOMMU 109 performs address translation as explained above.

Figure 2:
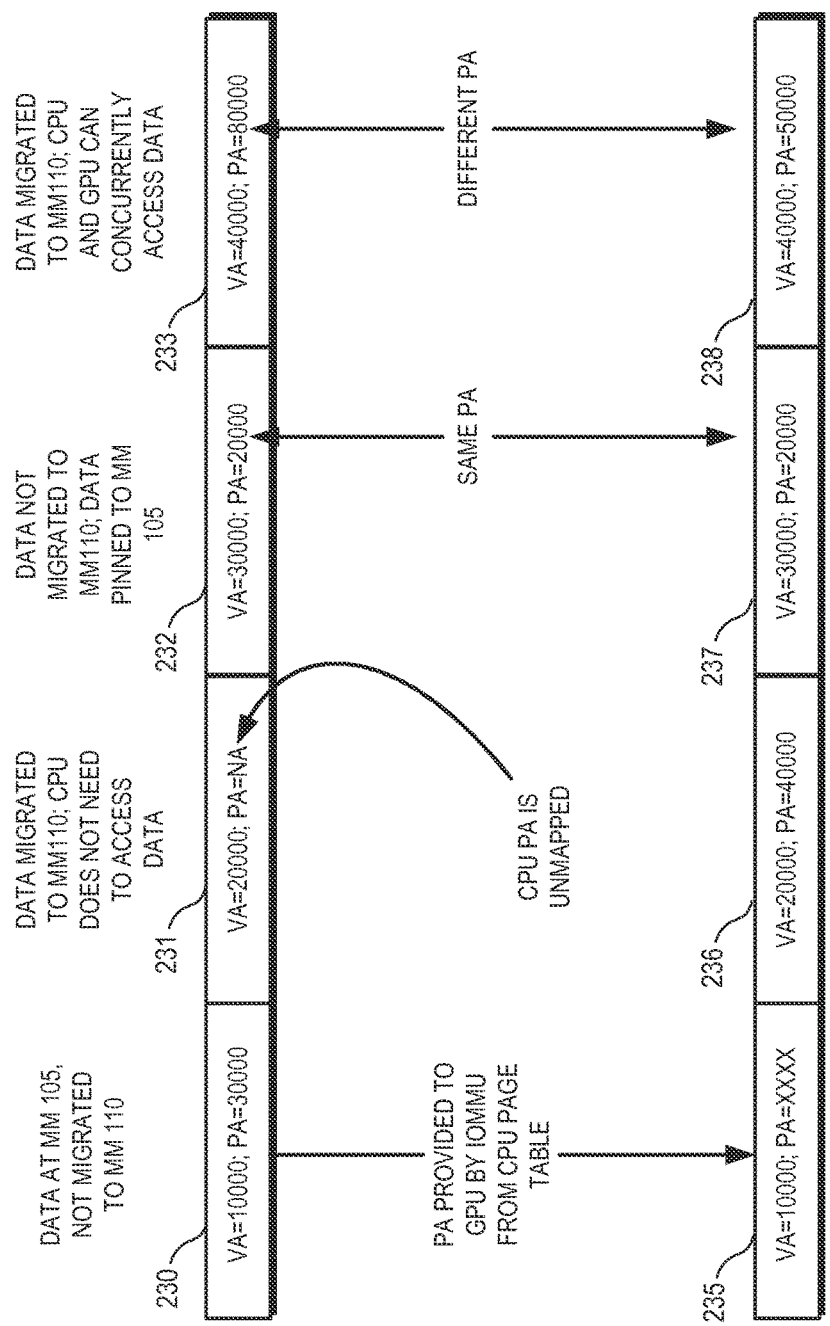
FIG. 2 is a block diagram illustrating different ways that the processor of FIG. 1 can translate virtual addresses to physical addresses in accordance with some embodiments.

FIG. 2 illustrates page table entries of the CPU page tables 120 and GPU page tables 125 corresponding to different types of pages in accordance with some embodiments. In particular, FIG. 2 illustrates CPU PTEs 230, 231, 232, and 233, and GPU PTEs 235, 236, 237, and 238. Each of the PTE pairs 230 and 235, 231 and 236, 232 and 237, and 233 and 238 refer to the same location in the virtual memory space for the processor 100. Accordingly, each of these PTE pairs shares the same virtual address (designated "VA" in FIG. 2). Further, each of the PTE pairs is associated with a different type of data page. In particular, the PTE pair 230 and 235 is associated with an unmigrated, unpinned page. Accordingly, the CPU PTE 230 stores a physical address (designated "PA") corresponding to the VA, resulting from a previous request to access the VA. Because the page is unpinned, the GPU PTE does not store a PA for the VA. Instead, the GPU 104 provides memory accesses targeted to the VA to the IOMMU 109, which retrieves the PA from the CPU PTE 230 and provides the PA to the memory controller 115 for execution of the memory access request.

The PTE pair 231 and 236 is associated with a migrated, no-CPU-access page. Accordingly, the GPU PTE 236 stores the PA corresponding to the VA for the entry. The PA for the VA is not maintained at the PTE 231, as the data is not accessed by the CPU 102. The PTE pair 232 and 237 is associated with an unmigrated, pinned page. Accordingly, both the CPU PTE 232 and GPU PTE 236 store the PA corresponding to the VA. This allows the GPU 104 to use its own page tables 125 for address translation for memory accesses targeted to the VA. The PTE pair 233 and 238 is associated with a migrated, CPU-access page. Accordingly, both the CPU PTE 233 and GPU PTE 238 store a PA corresponding to the VA, with the PA at each entry indicating the physical memory address for the data at the memory modules 105 and 110, respectively. This ensures that memory accesses to the VA by the CPU 102 are satisfied at the memory module 105, while memory accesses to the VA by the GPU 104 are satisfied at the memory module 110.

Figure 3:
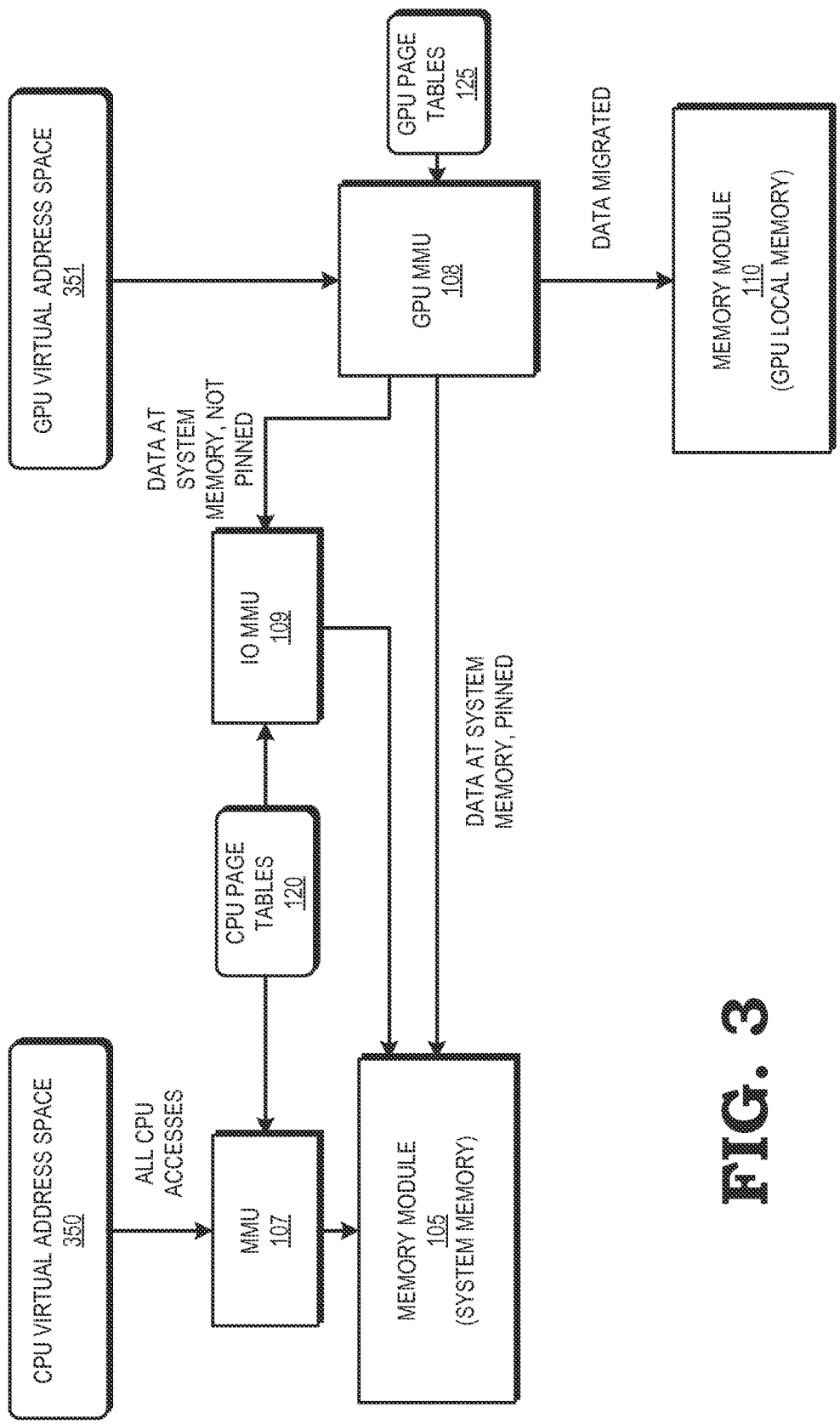
FIG. 3 is a block diagram illustrating a set of flows representing translation of virtual addresses at the processor of FIG. 1 in accordance with some embodiments.

FIG. 3 illustrates a block diagram depicting memory access flows for each of the different types of pages in accordance with some embodiments. For memory accesses by the CPU 102 to the CPU virtual address space 350, all memory accesses are provided to the CPU MMU 107, which uses the CPU page tables 120 to translate virtual addresses to physical addresses. The physical addresses at the CPU page tables 120 all correspond to locations of the memory module 105. Thus, all of the memory access requests from the CPU 102 are satisfied at the memory module 105.

Memory access requests generated by the GPU 104 and targeted to the GPU virtual address space 351 are provided to the GPU MMU 108, which identifies the type of page targeted by each memory access request. For a request targeted to an unmigrated, unpinned page, the GPU MMU 108 provides the memory access request to the IOMMU 109. In response, the IOMMU 109 translates the virtual address of the request to a physical address using the CPU page tables 120. Accordingly, the memory access request is satisfied at the memory module 105.

For a request targeted to an unmigrated, pinned page, the GPU MMU 108 translates the virtual address to a physical address using the GPU page tables 125. Because the page is pinned and unmigrated, the physical address will indicate a location of the memory module 105. Accordingly, the memory access request is satisfied at the memory module 105.

For a request targeted to a migrated page (either a CPU-access or a no-CPU access page), the GPU MMU 108 translates the virtual address to a physical address using the GPU page tables 125. Because the page is migrated, the physical address will indicate a location of the memory module 110. Accordingly, the memory access request is satisfied at the memory module 110.

Figure 4:
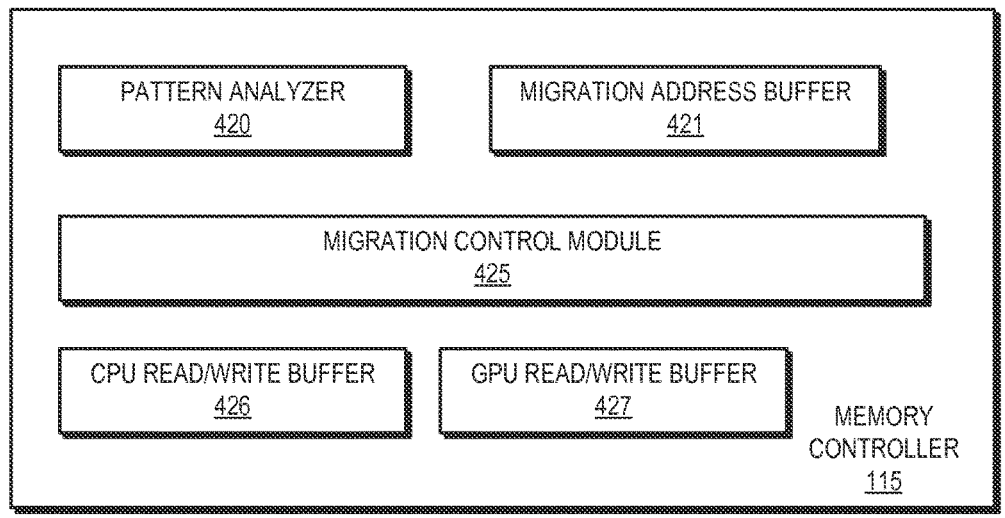
FIG. 4 is a block diagram of a memory controller of FIG. 1 that manages the interface between the virtual address space and a physical address space in accordance with some embodiments.

FIG. 4 illustrates the memory controller 115 in accordance with some embodiments. In the illustrated example, the memory controller 115 includes a pattern analyzer 420, a migration address buffer 421, a migration control module 425, a CPU read/write buffer 426, and a GPU read/write buffer 427. The migration address buffer 421 is configured to store physical addresses corresponding to memory accesses by the GPU 104 and CPU 102, including data migrations between the memory modules 105 and 110. The pattern analyzer 420 is configured to identify access patterns based on the addresses stored at the migration address buffer 421. In some embodiments the pattern analyzer 420 identifies a plurality of access patterns based on the addresses and determines a confidence level for each identified pattern. As additional addresses are added to the migration address buffer 421, the pattern analyzer 420 can adjust the confidence levels based on whether the additional addresses tend to provide evidence for or against the corresponding pattern. It will be appreciated that, in some embodiments, one or more functions of the memory controller, such as one or more operations of the pattern analyzer 420 and the migration control module 425, can be executed by a software program such as an operating system. In some embodiments, one or more of the functions can be implemented at a DMA engine. Further, in some embodiments, the processor 100 can include separate memory controllers for the memory modules 105 and 110, each of the controllers including modules similar to those illustrated at FIG. 4.

The migration control module 425 is configured to migrate data between the memory modules 105 and 110 based on the access patterns identified by the pattern analyzer 420. For example, in some embodiments the migration control module 425 compares each of the confidence levels identified by the pattern analyzer 420 to a corresponding threshold. In response to the confidence level for a given pattern exceeding a threshold, the migration control module 425 communicates control signaling to migrate data indicated by the pattern to the corresponding memory modules. To illustrate via an example, a given pattern may indicate that the GPU 104 frequently requests data corresponding to data 121, located at the memory module 105. Once the confidence level for the pattern increases above a corresponding threshold, the migration control module 425 communicates control signaling to the memory module 105 and the memory module 110 to copy the data 121 to the data 122 at the memory module 110.

The CPU read/write buffer 426 and GPU read/write buffer 427 store the memory accesses for the CPU 102 and GPU 104, respectively. The memory controller 115 uses the buffers 426 and 427 to buffer the memory accesses before issuing them to the memory modules 105 and 110. During a data migration, the memory controller 115 can stall memory accesses to the data being migrated by not issuing those memory accesses from the buffers 426 and 427. In some embodiments, during data migration the data is not removed from its original location. Accordingly, the memory controller 115 can continue to issue independent read requests to the original location of the data from the buffers 426 and 427, wherein an independent read request is a read request whose read data does not depend upon completion of a pending write request. The memory controller 115 can stall write requests and dependent read requests to the original data location while the data is being migrated, wherein a dependent read request whose read data depends upon completion of a pending write request. Upon completion of the data migration, the memory controller 115 can issue the write requests and dependent read requests to the original data location.

Figure 5:
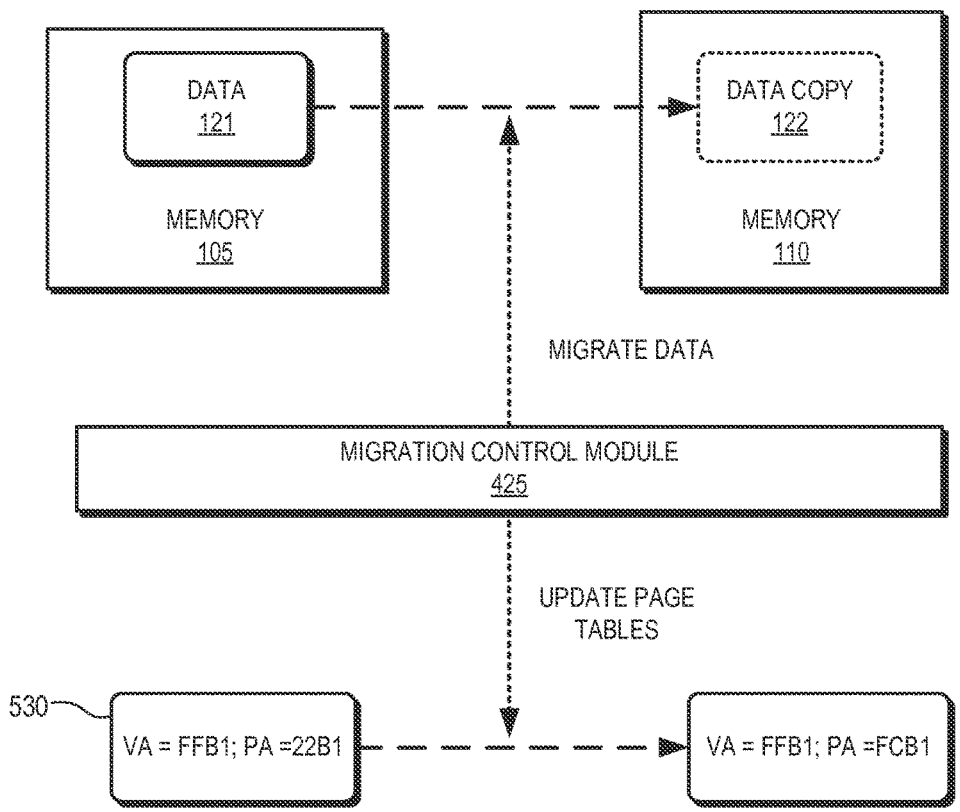
FIG. 5 is a block diagram illustrating a transfer of data between memory modules of the processor of FIG. 1 in accordance with some embodiments.

FIG. 5 illustrates an example data migration by the memory controller 115 in accordance with some embodiments. In the illustrated example, the migration control module 425 determines to migrate the data 121 from the memory module 105 to the memory module 110. Accordingly, the migration control module 425 copies the data 121 to the data 122 at the memory module 110. In addition, the migration control module 425 updates the GPU page tables 125 to reflect the physical address of the data 122 at the memory module 110. To illustrate, the GPU page tables 125 includes an entry 530 corresponding to the data 121. Prior to the data migration, the entry 530 indicates a virtual address (VA) corresponding to the data 121 of FFB1. The entry 530 also indicates the physical address (PA) of the data at the memory module 105 as PA 22B1. In response to copying the data 121 to the data 122 at the memory module 110, the migration control module 425 updates the PA of entry 530 to the value FCB1, indicating the physical address of the data at the memory module 110. The migration control module 425 does not change the VA of the entry 530, so that the data migration is transparent to operations executing at the GPU 104.

Figure 6:
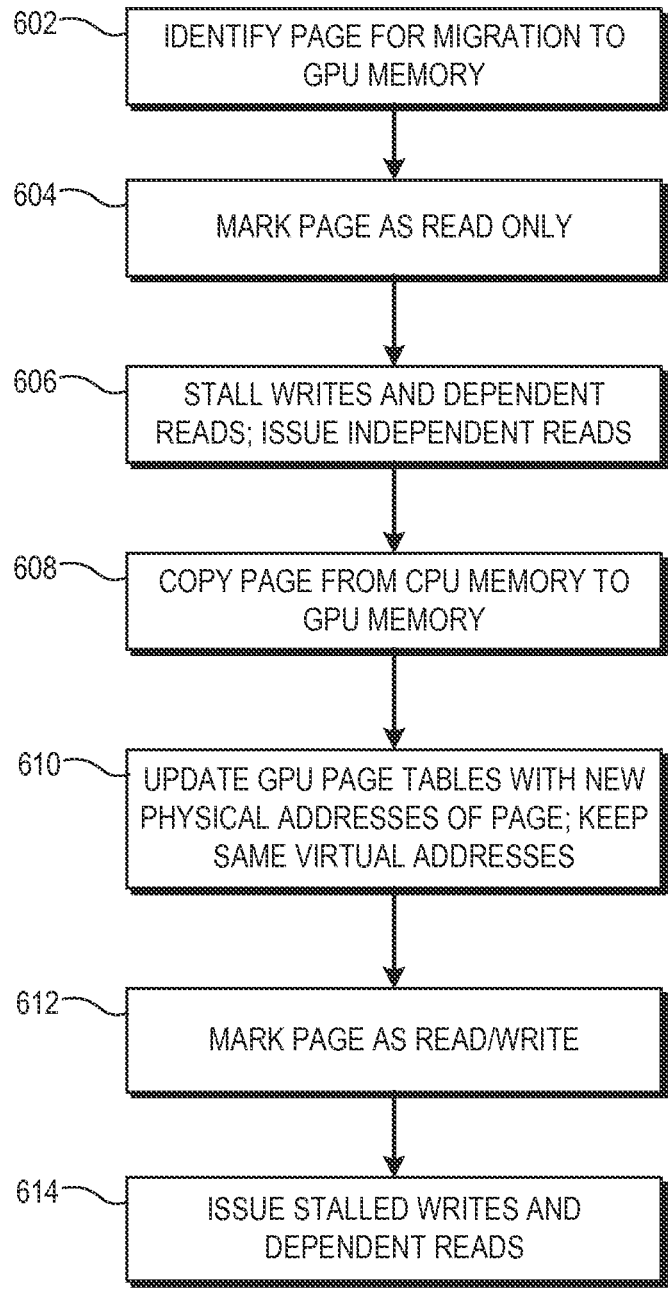
FIG. 6 is a flow diagram of a method of providing the same virtual address space for heterogeneous processing units of a processor in accordance with some embodiments.

FIG. 6 illustrates a flow diagram of a method 600 of migrating data between memory modules while maintaining a common virtual address space between processing units of different types in accordance with some embodiments. At block 602, the memory controller 115 identifies a page of data to be migrated from the memory module 105 to the memory module 110. At block 604, the memory controller 115 modifies a page table entry for the page being migrated to indicate that the page being moved is read only. In response, at block 606 the memory controller 115 stalls any pending GPU writes and dependent reads targeted to the page at the memory module 105. The GPU 104 continues to issue independent read requests to the page at the memory module 105.

At block 608 the memory controller 115 copies the migrating page from the memory module 105 to the memory module 110. At block 610 the memory controller 115 updates the GPU page tables 125 to reflect the physical addresses for the page at the memory module 110. The memory controller 115 does not change the virtual addresses for the page. This allows the CPU 102 and GPU 104 to share the same virtual address space while providing for data migration. The data migration is transparent to programs and operations executing at the CPU 102 and GPU 104, because those programs and operations executed on the GPU continue to be able to read from the memory, and the memory writes are temporarily stalled until the migration process is complete.

At block 612, after the copying of the page to the memory module 110 is complete, the memory controller 115 adjusts the GPU page table entry for the migrated page to indicate that the page has read/write status. In response, at block 614 the GPU 104 issues any stalled writes and dependent reads to the page at the memory module 105.

Figure 7:
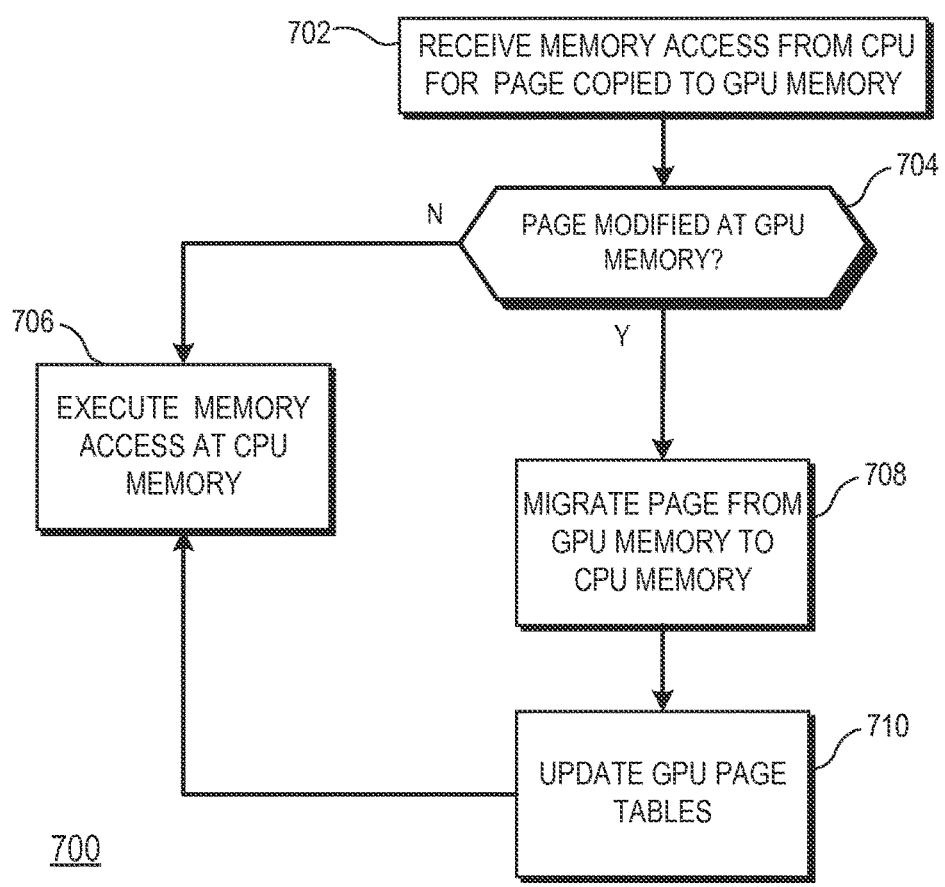
FIG. 7 is a flow diagram of a method of maintaining coherency between data copies for heterogeneous processing units of a processor in accordance with some embodiments.

FIG. 7 illustrates a flow diagram of a method 700 of performing a reverse migration of data to maintain coherency between data at different memory modules of a processor in accordance with some embodiments. The method of FIG. 7 assumes that it is the CPU 102 that is attempting to access data that has been migrated to the memory module 110 for access by the GPU 104. At block 702 the memory controller 115 receives a memory access request from the CPU 102, wherein the memory access is targeted to a page at the memory module 105 that has previously been migrated by copying it to the memory module 110. For example, the memory access request may be targeted to the data 121, which has previously been copied to the data 122 at the memory module 110. Further, the memory access request may target data that has been modified at the data 122, so that satisfying the memory access request at the data 121 without performing the reverse migration could result in an access to outdated data. Accordingly, the memory controller 115 performs a reverse migration to ensure that the data 121 is up to date with any changes at the data 122. In response, at block 704 the memory controller 115 determines whether the targeted page has been modified at the memory module 110. In some embodiments, the memory controller 115 makes this determination based on the GPU page tables 125. Each entry of the GPU page tables 125 can include a field to indicate whether the corresponding page has been modified. After migration of a page to the memory module 110, the memory controller clears the field for the corresponding page, indicating that the page has not been modified. In response to a write to the page by the GPU 104, the memory controller 115 sets the field for the page to indicate that the page has been modified.

If the memory controller 115 determines that the targeted page has not been modified at the memory module 110, the method flow moves to block 706 and the memory controller 115 issues the memory access to the memory module 105 for execution. If, at block 704, the memory controller 115 determines that the page has been modified at the memory module 110, the method flow moves to block 708 and the memory controller migrates the page from the memory module 110 to the memory module 105. In some embodiments, the memory controller 115 migrates the page by copying the page from the memory module 110 to the memory module 110. The method flow moves to block 710 and the memory controller 115 updates the GPU page tables 125 to reflect the physical addresses for the page are now at the memory module 105. The virtual addresses for the page at the GPU page tables 125 are left unchanged so that the migration is transparent to operations at the GPU 104. The method flow moves to block 706 and the memory controller 115 issues the memory access received at block 502 to the memory module 105 for execution. In some embodiments, the data 122 is maintained for subsequent access at the memory 110, so the physical addresses at the GPU page tables are left unchanged. In such cases, subsequent changes to the data 122 can be re-migrated to the data 121 as described above. Thus, in some embodiments the memory controller 115 maintains both the data 121 and the data 122, and periodically reconciles changes in one of the data 121 and 122 by copying the changes to the other.

In some scenarios, the GPU 104 can attempt to access migrated data that has been modified by the CPU 102 at the memory module 105. In those scenarios, the memory controller 115 can remap the PTE for the data being accessed at the GPU page tables 125 so that the entry is mapped to the location of the memory module 105, where the modified data is stored. The memory controller 115 thereby maintains coherency for migrated data.

In some embodiments, the apparatus and techniques described above are implemented in a system comprising one or more integrated circuit (IC) devices (also referred to as integrated circuit packages or microchips), such as the processor described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
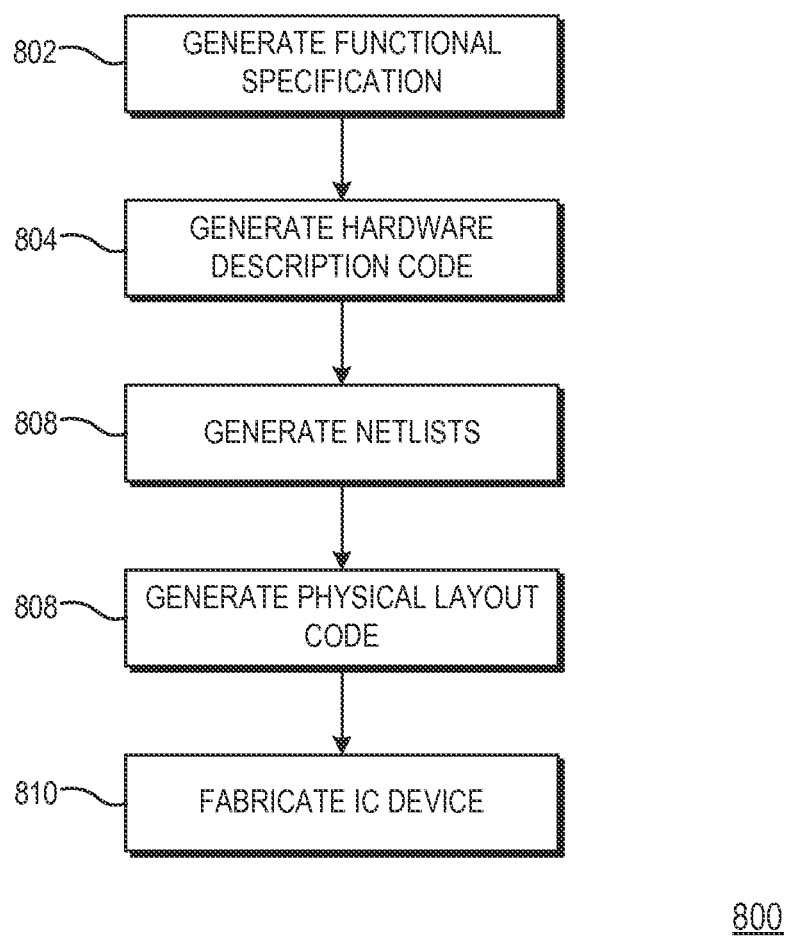
FIG. 8 is a flow diagram illustrating a method for designing and fabricating an integrated circuit device implementing at least a portion of a component of a processing system in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    translating, at a processor, virtual addresses for a virtual address space to a first set of physical addresses for a first processing unit of the processor; and
    translating, at the processor, the same virtual addresses for the virtual address space to a second set of physical addresses for a second processing unit of the processor, the second processing unit of a different processing unit type than the first processing unit.

2. The method of claim 1, wherein the second set of physical addresses includes addresses in the first set of physical addresses.

3. The method of claim 1, wherein a first physical address in the first set of physical addresses corresponding to a virtual address in the virtual address space is different from a second physical address in the second set of physical addresses corresponding to the virtual address.

4. The method of claim 1, wherein:
    translating virtual addresses to the first set of physical addresses comprises translating the virtual addresses based on a first set of page tables; and
    translating virtual addresses to the second set of physical addresses comprises translating the virtual addresses based on a second set of page tables different from the first set of page tables.

5. The method of claim 4, further comprising:
    transferring data from a first memory module associated with the processor to a second memory module associated with the processor; and
    updating the second set of page tables based on transferring the data so that the second set of physical addresses reflects physical addresses of the second memory module.

6. The method of claim 5, further comprising:
    maintaining the first set of page tables so that the first set of physical addresses for the data reflects physical addresses of the first memory module.

7. The method of claim 5, further comprising:
    updating the first set of page tables based on transferring the data so that the second set of physical addresses reflects physical addresses of the second memory module.

8. The method of claim 5, further comprising:
    in response to a memory access request from the first processing unit, identifying if the data has been modified by the second processing unit at the second memory module; and
    in response to identifying that the data has been modified at the second memory module, transferring the data from the second memory module to the first memory module.

9. The method of claim 5, further comprising:
    stalling execution of write requests to the data during the transfer of the data from the first memory module to the second memory module.

10. A method, comprising:
    maintaining a first set of page tables for a first processing unit of a processor, the first set of page tables reflecting a mapping between virtual addresses in a virtual address space and a first physical address space; and
    maintaining a second set of page tables for a second processing unit of the processor, the second set of page tables reflecting a mapping between the same virtual addresses in the virtual address space and a second physical address space.

11. The method of claim 10, wherein the first physical address space is different than the second physical address space.

12. The method of claim 10, further comprising:
    updating the second set of page tables in response to migration of data from a first memory module associated with the processor to a second memory module associated with the processor.

13. The method of claim 12, wherein updating the second set of page tables comprises updating physical addresses of the second set of page tables and maintaining corresponding virtual addresses of the second set of page tables.

14. A processor, comprising:
    a first processing unit of a first type;
    a second processing unit a second type different than the first type; and
    a memory management unit (MMU) to:
    translate virtual addresses for a virtual address space to a first set of physical addresses for the first processing unit; and
    translate the same virtual addresses for the virtual address space to a second set of physical addresses for the second processing unit.

15. The processor of claim 14, wherein the second set of physical addresses includes addresses in the first set of physical addresses.

16. The processor of claim 14, wherein a first physical address in the first set of physical addresses corresponding to a virtual address in the virtual address space is different from a second physical address in the second set of physical addresses corresponding to the virtual address.

17. The processor of claim 14, wherein:
   to translate virtual addresses to the first set of physical addresses comprises translating the virtual addresses based on a first set of page tables; and
   to translate virtual addresses to the second set of physical addresses comprises translating the virtual addresses based on a second set of page tables different from the first set of page tables.

18. The processor of claim 17, further comprising:
   a controller to migrate data from a first memory module associated with the processor to a second memory module associated with the processor, and to update the second set of page tables based on transferring the data so that the second set of physical addresses reflects physical addresses of the second memory module.

19. The processor of claim 18, wherein the controller is to:
   maintain the first set of page tables so that the first set of physical addresses for the data reflects physical addresses of the first memory module.

20. The processor of claim 14, wherein the first processing unit is a central processing unit and the second processing unit is a graphics processing unit.

* * * * *